Patented Aug. 10, 1943

2,326,182

UNITED STATES PATENT OFFICE 2,326,182

TITANIUM PIGMENT COMPOSITION AND PROCESS OF MAKING THE SAME

Seldon P. Todd, Gloucester City, Harold F. Saunders, Haddonfield, and Fredric C. Verduin, Audubon, N. J., assignors to The Sherwin-Williams Company, Cleveland, Ohio, a company of Ohio No Drawing. Application November 27, 1940, Serial No. 367,390

17 Claims. (Cl. 106—292)

The main object of the present invention is to reduce the time and/or the temperature required to convert titanium oxide having a crystalline structure of the anatase type to the rutile modification, and thereby improve the hiding power, whiteness, texture and other pigment properties. The invention relates more particularly to the treatment of a form of titanium oxide produced by a fluoride process, as distinguished from the form produced by a sulfuric acid process.

In the preparation of pigmentary titanium dioxide the usual procedures consist in precipitation of a hydrous titanium oxide from a solution of a titanium salt, washing, and drying the precipitate, and calcining it to remove water and acid and to develop the crystalline structure in order to improve opacity and other pigment properties.

When the hydrous titanium oxide has been precipitated by the thermal hydrolysis of a sulfuric acid solution of titanium, such as is obtained by the reaction between ilmenite and sulfuric acid (hereinafter referred to as ilmenite solution), calcination after the routine washing of the precipitate is accompanied by rapid growth and sintering together of the particles to an extent that by the time suitable opacity has been attained, the material is extremely hard and gritty, and contains particles aggregated together to a size in the range of 10 to 100 microns or larger, and thus is unsuitable for ordinary use as a pigment. To overcome this undesirable condition it is customary to add, prior to calcination, a substance which will permit development of crystallinity while retarding the sintering action.

Blumenfeld in his Patent 1,892,693, claims that the adding of a small amount of an alkaline carbonate to the hydrous precipitate prior to calcination is effective, and permits full development of opacity and color without considerable increase in the size of the particle. Goldschmidt, in Patent 1,348,129 has suggested the addition of halogen compounds volatile under calcination conditions, and Allan, in Patent 2,091,955, points out objections to these and suggests the use of nonvolatile fluorides for conditioning of the precipitate. McKinney, in his Patent 2,150,235, adds to the hydrous oxide a sufficient amount of an alkali metal salt to produce therein a definite "molar ratio" of the alkali metal salt to the phosphoric radical originally present or added to the precipitate. Rhodes, in his Patent 2,078,278, adds prior to calcination a small quantity of barium, strontium, calcium, or other titanate of the alkali earth group to obtain a product of improved opacity and mixing properties, and lower oil absorption.

In the processes as described in these patents there is apparently some relation between the —$SO_4$ ions which are always present either chemically combined or adsorbed upon the hydrous particles obtained by hydrolysis of sulfuric solutions of titanium, several of these patentees specifically referring to "neutralization" of the —$SO_4$ in the conditioning step.

The "fluoride" process for manufacturing titanium dioxide as disclosed, for instance, by Svendsen in Patents 2,042,435 and 2,042,436, or Verduin and Todd in application Serial No. 321,974, comprises precipitation of hydrous titanium dioxide by contacting a solution of a titanium-ammonium-fluoride compound with aqua ammonia and washing and calcining the so obtained precipitate. The hydrous oxide differs from that of the sulfate process in the absence of —$SO_4$ ions, and is characterized by retention of a small proportion of $NH_3$.

There is a further characteristic difference between the hydrous oxides made by the sulfuric and the fluoride processes. The sulfate process hydrate when examined by X-ray diffraction methods yields a band pattern typical of the anatase crystalline modification of $TiO_2$. The precipitate obtained in the fluoride process, on the contrary, yields a band pattern, the bands of which correspond in position to neither the anatase nor the rutile characteristic positions. It is a hydrous titanium oxide comprising essentially titanium, hydrogen and oxygen and having a lattice structure in which said elements are so arranged as to conform to the X-ray spacings measured in Angstrom units set forth in column 1 of the following table in which columns II and III set forth the characteristic spacings of the pattern exhibited by hydrous oxides obtained by thermal hydrolysis of sulfuric acid solutions of titanium and hydrochloric acid solutions of titanium respectively, being those of anatase and of rutile, as set forth in Weiser and Milligan, Journal of Physical Chemistry, April, 1934, page 517:

| Col. I<br>γ-titanic acid<br>d/n | Col. II<br>Anatase<br>d/n | Col. III<br>Rutile<br>d/n |
| --- | --- | --- |
| A. U. | A. U. | A. U. |
| 5.83 | 3.49 | 3.24 |
| 3.99 | 2.37 | 2.48 |
| 3.40 | 1.883 | 2.29 |
| 3.145 | 1.695 | 2.18 |
| 2.600 | 1.655 | 2.04 |
| 2.342 | 1.477 | 1.685 |
| 2.132 | 1.358 | 1.617 |
| 1.888 | 1.334 | 1.479 |
| 1.696 | 1.261 | 1.448 |
| 1.499 | 1.161 | 1.351 |
| 1.354 | 1.044 | 1.240 |
| 1.247 | 1.015 | 1.167 |
| 1.177 | 0.951 | 1.144 |
| 1.087 | 0.913 | 1.092 |
| 1.048 | 0.892 | 1.037 |
| 1.011 | 0.876 | ------ |
| 0.956 | 0.843 | ------ |
| 0.917 | 0.824 | ------ |
| 0.894 | 0.806 | ------ |
| 0.868 | ------ | ------ |
| 0.843 | ------ | ------ |
| 0.813 | ------ | ------ |
| 0.785 | ------ | ------ |
| 0.747 | ------ | ------ |
| 0.712 | ------ | ------ |
| 0.692 | ------ | ------ |
| 0.682 | ------ | ------ |
| 0.670 | ------ | ------ |
| 0.656 | ------ | ------ |

This $TiO_2$ modification on Column I has been termed γ-titanic acid (McCord, Serial No. 349,345), and is the form referred to by the term "γ-titanic acid" in this specification and the appended claims. As those skilled in the art will understand, it is not possible to be sure that all of the spacings that have been observed are characteristic of the product itself, and that some of them are not characteristic but are due to incidental or accidental impurities. Accordingly, the term "substantially" as used herein is to be interpreted so as to permit the elimination from column I of the table of these spacings that may be shown later to belong to materials present as impurities. Calcination of γ-titanic acid below approximately 800–850° C. causes a transition of the γ-titanic acid to a form which on X-ray analysis shows essentially a typical anatase pattern. Calcination at higher temperatures again changes the crystalline structure so that eventually the product of such higher calcination temperature shows a typical rutile pattern.

It is known that the factor of time enters into the transition of a material subject to change of crystal structure by thermal energy. There is usually a minimum transition temperature below which no change from one crystalline form to another will occur. At higher temperatures the rate of transition is dependent upon the temperature, and the condition may be determined by an equation of the type $K=(x-t)y$, wherein $K$ is a constant, $t$ is the transition temperature, $x$ is the temperature of calcination, and $y$ is the time of calcination. Thus, at the minimum transition temperature for a change from anatase modification of $TiO_2$ to the rutile modification, the time required to effect complete conversion may be unduly long from a practical consideration. For this reason, when it is desired to effect transition in the calcination of materials subject to transition of crystal modification by thermal energy, it is customary to employ temperatures considerably above the minimum transition temperature, since as the temperature of calcination is progressively increased above the minimum transition temperature, the time factor is progressively reduced.

The increase in temperature, however, results in certain objectionable action, since it is usually the case that with increase of temperature other physical characteristics of the material are deleteriously affected.

In the case of white pigments, such as zinc sulfide and titanium dioxide, this deleterious effect appears as progressive decrease in color, brightness, texture, etc.

Experiment has shown that treatment of the fluoride process precipitate with alkali carbonate or the other agents suggested in the prior art may be definitely deleterious in effect, retarding the transition from anatase to rutile.

Calcination of the fluoride precipitate accomplishes not only removal of water and volatile substances, such as the $NH_3$ and development of a crystalline structure, but also effects a transition of crystalline structure from the γ-titanic acid modification as above defined to a crystalline structure of the anatase type, and finally to the rutile modification. The addition of the alkaline carbonates or other agents of the prior art appears to retard the transition from anatase to rutile.

We have discovered that in the calcination of hydrous titanium oxide obtained by the fluoride process, the presence of small amounts (in the order of 0.1 to 3.0% by weight, based on the weight of the $TiO_2$) of soluble sulfates, oxides, or other compounds of the metals of sub-group IIb of the periodic table (beryllium, magnesium, zinc, cadmium and mercury) favorably affects the transition of anatase to rutile, permitting the use of somewhat lower calcination temperatures, and production of a pigmentary rutile of improved hiding, whiteness, and texture. We will hereinafter refer to these metals as comprising group IIb, although some writers classify beryllium and magnesium as group II typical elements, and put only zinc, cadmium and mercury in group IIb.

The hydrate made by the fluoride process, as distinguished from the hydrate made by the sulfate process, may be calcined to produce a product of satisfactory pigmentary properties without the use of such addition agents, since sintering in calcination of fluoride hydrate takes place normally only at temperatures well above that required to develop the optimum hiding power in the pigment, nevertheless, the ability to utilize lower temperatures is an economy in commercial operation both in saving of fuel and in lessening the rigidity of control, since the danger of local overheating, always present in commercial kilns is materially lessened at reduced temperatures. The ability to use lower temperatures, in turn favorably affects brightness and whiteness, and an extremely soft pigment of low oil absorption and high tinting strength and hiding power, whiteness, and brightness results.

In the practice of our process it is preferred to add between 0.1 to 3.0% of a water-soluble sulfate of a metal of the IIb periodic group, although other compounds of this group of metals, as, for instance, oxides, hydroxides, salts, or compounds other than sulfate, or complex salts, as, for instance, zinc-ammonium hydroxide, may be employed with favorable result. Of the group IIb elements, beryllium, magnesium, zinc and cadmium form water-soluble sulfates, while the sulfate of mercury is slightly soluble.

The quantity of treating agent used may vary considerably, according to the agent used, differences in the hydrates due to different processing conditions, and other factors, but our experiments have shown that ordinarily from 0.1% to 3.0% of the agent calculated in terms of its oxide, and based on the weight of the $TiO_2$ to be treated, is the optimum range, and for most conditions 0.2% is preferable.

In the preferred practice of our invention the hydrous titanium dioxide is precipitated, washed, and separated according to the method disclosed in the Verduin and Todd application, Serial No. 321,974. The aqueous suspension after washing and separating the bulk of the water is adjusted to contain approximately 6% of titanium calculated as $TiO_2$. The concentration of slurry is not critical, concentrations of from 4% to 15% having been used with satisfactory result. To this suspension, preferably at room temperature, (although any temperature even at a boil does not materially change results) is added a quantity of zinc sulfate, previously dissolved in a little water, in an amount equivalent to 0.2% calculated as $ZnO$ on the weight of the $TiO_2$ present.

As an alternate practice, one may substitute for zinc sulfate the oxide, hydroxide, carbonate or sulfate, or other salt of beryllium, magnesium, zinc, cadmium or mercury, or combination thereof. It is preferable, largely for simplicity of practice, that the agent employed be at least somewhat soluble in water, but it has been found that insoluble compounds of this group may be substituted with equivalent effect.

The quantity required for a given hydrate in order to obtain maximum development of opacity, whiteness, texture, and other pigment characteristics with rutile crystalline structure, or the optimum temperature required for a given quantity of any specific agent among those listed, may be predetermined in the laboratory by experimentally treating portions of the hydrate and calcining at different temperatures. This predetermination practice may be followed as a guide for operation of the production calciner on a given agent and proportion thereof, or for determining the quantity of agent which is optimum for practice in obtaining a final pigmentary product of predetermined desired characteristics. It is found generally that whereas small quantities of agent, in the range of 0.1% to 1.0% is sufficient to effect acceleration in the rate of conversion to rutile at lower temperatures, with maximum opacity, brightness, color and texture, the use of quantities in excess of 2 to 3%, although increasing the ease of conversion to rutile, begins to accelerate growth of particles and some sintering may even occur with accompanying tendency toward hard texture.

The temperature required to obtain maximum tinting strength and hiding power by still calcination for 4 hours of a small sample in the laboratory, is reduced by a factor equivalent to from 75° to 100° when the calcination is effected in a commercial size plant rotary calciner. The exact factor varies, of course, with the particular type, size, and heating conditions of the kiln. During passage through the kiln, the material is raised gradually to the maximum temperature over a period of 8 hours or longer, and, in addition, crystallization and growth is accelerated by the multiplicity of chance contacts between faces of separate crystals through the tumbling and forward motion of the material in the kiln. In the laboratory the sample is placed in a furnace already at the temperature selected, and is rapidly brought to that temperature. The number of contacts of crystal faces is very considerably lessened, even when periodic raking or rabbling is employed. For example, laboratory results on a given sample determined as optimum at 975° C. for 4 hours correspond to those obtained in a commercial rotary kiln at 900° C. for a total time in the kiln of about 10 hours.

The slurry after addition of the agent is thoroughly agitated, the bulk of the water separated, and the material fed, either moist or after drying, into a calciner, preferably of the rotary type, maintained at the conditions predetermined by means of the trial runs in the laboratory as discussed above. This temperature of calcination is within the 800 to 1000° C. range. In the particular case described, a temperature of 875° C. in the rotary calciner at the front end, with the material remaining in the calciner for approximately 12 hours, produced a pigment which upon X-ray analysis produced a diffraction pattern showing among the lines $TiO_2$ those of rutile only, a tinting strength of 1425, high degree of whiteness, brightness and texture, and other characteristics conforming to the conventional requirements for a satisfactory pigment.

Although the best results, so far as concerns rutile formation, are secured by the use of compounds of the metals of sub-group IIb of the periodic table, it is possible to obtain commercially satisfactory results as to color effect, by using the water-soluble compounds of the metals of sub-group IIa, namely calcium, barium and strontium.

The compounds of the metals may include not only the sulfates, oxides and hydroxides previously mentioned, but also carbonates, chlorides, nitrates, acetates, ammonium complex salts, and the like.

It is further found that a very satisfactory pigment of anatase crystal modification, of soft texture, low oil absorption, and very soft texture may be obtained by conducting the calcination of the hydrate condition as described above, at a temperature below that at which transition to rutile takes place, or that mixtures of anatase and rutile may be produced at intermediate temperatures. Thus, when the hydrate conditioned with 0.2% zinc sulfate as described was calcined in a rotary calciner for 10 hours at 775° C., examination of the sample by X-ray analysis showed a pattern containing among the lines characteristic of $TiO_2$ compounds, those of anatase only, and a lot run at 825° C. showed a pattern containing lines of both anatase and rutile, indicating a mixture of the two crystal modifications. Increasing quantities of rutile in proportion to anatase are obtained as the temperature of calcination approaches 875° C.

Although the process has been described as including the addition of the specified agent to the titanium hydrate, it is to be understood that this is not to be interpreted as necessitating the absence of other ingredients in the mixture to be calcined. For instance, the present process may be employed in connection with the preparation of extended pigments as disclosed and claimed in the McCord application, Serial No. 349,345.

It is to be understood that wherever the percentage of the added agent is given in the foregoing description and in the following claims, it is that agent computed as oxide, and based on the weight of the dry hydrate calculated as $TiO_2$.

Having thus described our invention, what we claim as new and desire to secure by Letters Patent is:

1. The process of preparing a titanium oxide pigment, which includes calcining a hydrous titanium oxide obtained by precipitation from a solution of a complex titanium ammonium fluoride, and to which has been added, after precipitation and washing, a compound of a metal of group II of the periodic table.

2. The process of preparing a titanium oxide pigment, which includes calcining a hydrous titanium oxide obtained by precipitation from a solution of a complex titanium ammonium fluoride, and to which has been added, after precipitation and washing, a compound of a metal of sub-group IIb.

3. The process of preparing a titanium oxide pigment, which includes calcining a hydrous titanium oxide obtained by precipitation from a solution of a complex titanium ammonium fluoride, and to which has been added, after precipitation and washing, a water-soluble compound of a metal of group II of the periodic table.

4. The process of preparing a titanium oxide pigment, which includes calcining a hydrous titanium oxide obtained by precipitation from a solution of a complex titanium ammonium fluoride, and to which has been added, after precipitation and washing, a water-soluble compound of a metal of sub-group IIb.

5. The process of preparing a titanium oxide pigment, which includes calcining a hydrous titanium oxide obtained by precipitation from a solution of a complex titanium ammonium fluoride, and to which has been added, after precipitation and washing, not to exceed 3% of a compound of a metal of sub-group IIb of the periodic table.

6. The process of preparing a titanium oxide pigment, which includes calcining a hydrous titanium oxide obtained by precipitation from a solution of a complex titanium ammonium fluoride, and to which has been added, after precipitation and washing, 0.1 to 1.0% of a compound of a metal of sub-group IIb of the periodic table.

7. The process of preparing a titanium oxide pigment, which includes calcining a hydrous titanium oxide obtained by precipitation from a solution of a complex titanium ammonium fluoride, and to which has been added, after precipitation and washing, a water-soluble zinc compound.

8. The process of preparing a titanium oxide pigment, which includes calcining a hydrous titanium oxide obtained by precipitation from a solution of a complex titanium ammonium fluoride, and to which has been added, after precipitation and washing, a water-soluble magnesium compound.

9. The process of preparing a titanium oxide pigment, which includes calcining a hydrous titanium oxide obtained by precipitation from a solution of a complex titanium ammonium fluoride, and to which has been added, after precipitation and washing, a water-soluble beryllium compound.

10. The process of preparing a titanium oxide pigment, which includes calcining a hydrous titanium oxide obtained by precipitation from a solution of a complex titanium ammonium fluoride, and to which has been added, after precipitation and washing, zinc sulfate.

11. The process of preparing a titanium oxide pigment, which includes calcining a hydrous titanium oxide obtained by precipitation from a solution of a complex titanium ammonium fluoride, and to which has been added, after precipitation and washing, magnesium sulfate.

12. The process of preparing a titanium oxide pigment, which includes calcining a hydrous titanium oxide obtained by precipitation from a solution of a complex titanium ammonium fluoride, and to which has been added, after precipitation and washing, beryllium sulfate.

13. The process of preparing rutile in pigmentary form, which includes mixing a small percentage of a compound of a metal of sub-group IIb of the periodic table with $\gamma$-titanic acid, and calcining the mixture.

14. The process of preparing rutile in pigmentary form, which includes mixing not to exceed about 3% of a compound of a metal of sub-group IIb of the periodic table with $\gamma$-titanic acid, and calcining the mixture.

15. As a new pigment composition, a product substantially identical with that obtainable by cocalcining $\gamma$-titanic acid mixed with a small amount of a compound of group II.

16. As a new pigment composition, a product substantially identical with that obtainable by cocalcining $\gamma$-titanic acid mixed with a small amount of a compound of sub-group IIb.

17. As a new pigment composition, a product substantially identical with that obtainable by cocalcining a mixture of $\gamma$-titanic acid, an extender, and a small amount of a water soluble compound of a metal of sub-group IIb.

SELDON P. TODD.
HAROLD F. SAUNDERS.
FREDRIC C. VERDUIN.